(12) United States Patent
Smeaton et al.

(10) Patent No.: US 8,090,680 B2
(45) Date of Patent: Jan. 3, 2012

(54) METHOD AND SYSTEM FOR LOCATING DATA

(75) Inventors: Alan F. Smeaton, Malahide (IE); Colum P. J. Foley, Balbriggan (IE); Gareth J. F. Jones, Swords (IE)

(73) Assignee: Dublin City University, Dublin (IE)

( * ) Notice: Subject to any disclaimer, the term of this patent is extended or adjusted under 35 U.S.C. 154(b) by 392 days.

(21) Appl. No.: 12/213,381

(22) Filed: Jun. 18, 2008

(65) Prior Publication Data

US 2009/0319509 A1    Dec. 24, 2009

(51) Int. Cl.
*G06F 17/00* (2006.01)
*G06F 17/30* (2006.01)
(52) U.S. Cl. ........ 707/608; 707/705; 707/759; 707/766; 707/770
(58) Field of Classification Search .................. 707/705, 707/713, 721, 758, 765, 766, 608, 759, 770
See application file for complete search history.

(56) References Cited

U.S. PATENT DOCUMENTS

| | | | |
|---|---|---|---|
| 6,775,664 B2 * | 8/2004 | Lang et al. ............................. | 1/1 |
| 7,496,626 B2 * | 2/2009 | Kulkarni et al. .............. | 709/204 |
| 7,860,852 B2 * | 12/2010 | Brunner et al. ................ | 707/706 |
| 2006/0161507 A1 * | 7/2006 | Reisman ........................... | 706/12 |
| 2008/0281809 A1 * | 11/2008 | Anderson et al. .................. | 707/5 |

OTHER PUBLICATIONS

Colum Foley et al, Synchronous Collaborative Information Retrieval with Relevance Feedback, 2006, pp. 1-4.*

Adcock, J.A., et al. FXPAL Interactive Search Experiments for TRECVID 2007, TRECVid 2007—Text Retrieval Conference TRECVID Workshop, Gaithersburg, MD, USA, 2007.

Blackwell, A.F., et al. Tangible Interface for Collaborative Information Retrieval, CHI '04: Extended Abstracts on Human Factors in Computing Systems, Vienna, Austria, Apr. 24-29, 2004, p. 1-4.

Buckley, C., et al. "The Effect of Adding Relevance Information in a Relevance Feedback Environment", SIGIR '94: Proceedings of the 17th Annual International ACM SIGIR Conference on Research and Development in Information Retrieval, Dublin, Ireland, 1994, p. 292-300.

Cleverdon, C., et al. "Factor Determining the Performance of Indexing Systems", *ASLIB Cranfield Research Project*, vol. I, 1966, p. 1-126.

Cleverdon, C. & Keen, M., et al. "Factor Determining the Performance of Indexing Systems", *ASLIB Cranfield Research Project*, vol. II, 1966, p. 1-313.

(Continued)

*Primary Examiner* — Angela Lie
(74) *Attorney, Agent, or Firm* — Roylance, Abrams, Berdo & Goodman, L.L.P.

(57) ABSTRACT

A system is provided for locating data in a distributed data environment, in which at least two users share a common data requirement. The environment comprises a plurality of network-connected data terminals. The system comprises at least one of the network-connected data terminals, which includes means for each of the at least two users to submit a data locating query, means for each of the at least two users to receive a query result, means for each of the at least two users to input respective relevance feedback data in response to the received query result, means for combining the respective relevance feedback data in real time, and means for processing data locating queries with the combined respective relevance feedback data. A method is also provided for locating data in the distributed data environment.

13 Claims, 6 Drawing Sheets

OTHER PUBLICATIONS

Cronen-Townsend, S., et al. "Predicting Query Performance", Proceedings of the 25th Annual International ACM SIGIR Conference on Research and Development in Information Retrieval (SIGIR 2002), Tampere, Finland, Aug. 11-15, 2002, p. 299-306.

Dalal, M., "Personalized Social & Real-Time Collaborative Search", WWW '07: Proceedings of the 16th International Conference on World Wide Web, Banff, Alberta, Canada, May 8-12, 2007, p. 1285-1286.

Diamadis, E. T. & Polyzos, G. C., "Efficient Cooperative Searching on the Web: System Design and Evaluation", *International Journal of Human-Computer Studies*, Sep. 1, 2004, p. 699-725.

Diaz, F., "Performance Prediction Using Spatial Autocorrelation", SIGIR '07: Proceedings of the 30th Annual International ACM SIGIR Conference on Research and Development in Information Retrieval, Amsterdam, The Netherlands, 2007, p. 583-590.

Dietz, P. & Leigh, D., "DiamondTouch: A Multi-User Touch Technology", UIST '01: Proceedings of the 14th Annual ACM Symposium on User Interface Software and Technology, Orlando, Florida, 2001, p. 219-226.

Foley, C., et al., "Synchronous Collaborative Information Retrieval with Relevance Feedback", CollaborateCom 2006—2nd International Conference on Collaborative Computing: Networking, Applications and Worksharing, Adelaide, Australia, 2006, p. 1-4.

Gianoutsos, S. & Grundy, J., "Collaborative Work with the World Wide Web: Adding CSCW Support to a Web Browser", Procedingss of Oz-CSCW'96, DSTC Technical Workshop Series, University of Queensland, University of Queensland, Brisbane, Australia, 1996, p. 14-21.

Greenberg, S. & Roseman, M., et al., "GroupWeb: a WWW Browser as Real Time Groupware", CHI '96: Conference Companion on Human Factors in Computing Systems, Vancouver, British Columbia, Canada, 1996, p. 271-272.

Gross, T., "Supporting Awareness and Cooperation in Digital Information Environments", *Basic Research Symposium at the Conference on Human Factors in Computing Systems—CHI '99*, Pittsburgh, Pennsylvania, USA, 1999.

Haines, D. & Croft, B.W., "Relevance Feedback and Inference Networks", *SIGIR '93: Proceedings of the 16th Annual International ACM SIGIR Conference on Research and Development in Information Retrieval*, Pittsburgh, Pennsylvania, USA, 1993, p. 2-11.

Han, R., et al., "WebSplitter: A Unified XML Framework for Multi-Device Collaborative Web Browsing", *CSCW '00: Proceedings of the 2000 ACM Conference on Computer Supported Cooperative Work*, Philadelphia, Pennsylvania, USA, 2000, p. 221-230.

Harman, D., "Relevance Feedback Revisited", *SIGIR '92: Proceedings of the 15th Annual International ACM SIGIR Conference on Research and Development in Information Retrieval*, Copenhagen, Denmark, 1992, p. 1-10.

He, B. & Ounis, I., "Inferring Query Performance Using Pre-retrieval Predictors", *Department of Computer Science*, 2004, p. 1-10.

Krishnappa, R., "Multi-User Search Engine (MUSE): Supporting Collaborative Information Seeking and Retrieval", Master's Thesis, University of Missouri-Rolla, 2005.

Laurillau, Y. & Nigay, L., "Model of Collaborative and Synchronous Navigation for Large Information Space", Workshop on Social Navigation: A Design Approach?, Extended Abstracts, (CHI2000), 2000 p. 375.

Lieberman, H., et al., "Let's Browse: A Collaborative Web Browsing Agent", IUI '99: Proceedings of the 4th International Conference on Intelligent User Interfaces, Los Angeles, California, USA, 1999, p. 65-68.

Maekawa, T., et al., "A Collaborative Web Browsing System for Multiple Mobile Users", *PERCOM '06: Proceedings of the Fourth Annual IEEE International Conference on Pervasive Computing and Communications (PERCOM'06)*, Washington, DC, USA, p. 22-35, 2006.

Maron, M.E. & Kuhns, J.L., "On Relevance, Probabilistic Indexing and Information Retrieval", Journal of the ACM, 1960, p. 216-244.

Microsoft Corporation, "Live Search: Shared Search on Messenger", Microsoft, 2008, p. 1-6.

Microsoft Corporation, "Microsoft Surface: FAQS", Microsoft, 2008, p. 1-3.

Morris, M.R., et al., "TeamSearch: Comparing Techniques for Co-Present Collaborative Search of Digital Media", TABLETOP '06: Proceedings of the First IEEE International Workshop on Horizontal Interactive Human-Computer Systems, Adelaide, South Australia, Australia, 2006, p. 97-104.

Morris, M.R. & Horvitz, E., "SearchTogether: An Interface for Collaborative Web Search", UIST '07: Proceedings of the 20th Annual ACM Symposium on User Interface Software and Technology, Newport, Rhode Island, USA, 2007, p. 3-12.

Netscape, "Collaborative Browsing with Netscape Conference", Netscape, 2001, p. 1-2.

Nielsen, Jakob, "Search:Visible and Simple (Alertbox)", 2001, p. 1-3.

Robertson, S.E. & Spräck Jones, K. "Relevance Weighting of Search Terms", *Journal of the American Society for Information Science*, vol. 23, No. 3, May-Jun. 1976, p. 129-146.

Robertson, S.E. "Documentation Note on Term Selection for Query Expansion", *Journal of Documentation*, vol. 46, No. 4, Dec. 1990, p. 359-364.

Robertson, S.E. & Spräck Jones, K., "Simple, Proven Approaches to Text Retrieval", *Technical Report 356, Computer Laboratory*, University of Cambridge, Dec. 1994.

Salton, G., et al., "A Vector Space Model for Automatic Indexing", *Communications of the ACM*, vol. 18, No. 11, Nov. 1975, p. 613-620.

Salton, Automatic Text Processing: The Transformation, Analysis, and Retrieval of Information by Computer, "Chapter 10: Advanced Information-Retrieval Models", 1989, p. 313-326.

Salton, G. & Buckley, C., "Improving Retrieval Performance by Relevance Feedback", *Journal of the American Society for Information Science*, vol. 41, No. 4, Jun. 1990, p. 288-297.

Shen, C., et al., "DiamonSpin: An Extensible Toolkit for Around-the-Table Interaction", CHI '04: Proceedings of the SIGCHI Conference on Human Factors in Computing Systems, Vienna, Austria, Apr. 24-29, 2004, p. 167-174.

Smeaton, A.F., et al., "The Fischlár Digital Video System: A Digital Library of Broadcast TV Programmes", *JCDL 2001—ACM+IEEE Joint Conference on Digital Libraries*, Roanoke, VA, USA, Jun. 24-28, 2001, p. 312-313.

Smeaton, Alan F., et al., "Collaborative Video Searching on a Table Top", Multimedia Systems Journal, Aug. 16, 2006, p. 375-391.

Spink, A., et al., "U.S. Versus European Web Searching Trends", SIGIR Forum 36, 2002, p. 32-38.

Stewart, J., et al., "Single Display Groupware: A Model for Co-Present Collaboration", CHI '99: Proceedings of the SIGCHI Conference on Human Factors in Computing Systems, Pittsburgh, Pennsylvania, USA, (1999), p. 286-293.

Vinay, V., et al., "On Ranking the Effectiveness of Searches", SIGIR '06: Proceedings of the 29th Annual International ACM SIGIR Conference on Research and Development in Information Retrieval, Seattle, Washington, USA, 2006, p. 398-404.

Yom-Tov, E., et al., "Learning to Estimate Query Difficulty: Including Applications to Missing Content Detection and Distributed Information Retrieval", *SIGIR '05: Proceedings of the 28th Annual International ACM SIGIR Conference on Research and Development in Information Retrieval*, Salvador, Brazil, Aug. 15-19, 2005, p. 512-519.

Zhou, Y., & Croft, B.W., "Ranking Robustness: A Novel Framework to Predict Query Performance", CIKM '06: Proceedings of the 15th ACM International Conference on Information and Knowledge Management, Arlington, Virginia, USA, Nov. 6-11, 2006, p. 567-574.

Zhou, Y. & Croft, B.W., "Query Performance Prediction in Web Search Environments", SIGIR '07: Proceedings of the 30th Annual International ACM SIGIR Conference on Research and Development in Information Retrieval, Amsterdam, The Netherlands, 2007, p. 543-550.

* cited by examiner

METHOD AND SYSTEM FOR LOCATING DATA

BACKGROUND OF THE INVENTION

1. Field of the Invention

The present disclosure relates to a method and system for locating data or resources in a distributed environment, such as a network of terminals. More particularly, the present disclosure relates to a method and system for collaboratively searching and locating data and/or resources in such a network.

2. Description of the Prior Art

The development and ever-increasing interfacing of distributed environments, for instance networks of data processing terminals of varying scales, have greatly facilitated the potential for users to satisfy any information need. As an ever-increasing number of interfaced distributed environments eventually contributes to a define a potentially limitless repository of data and/or resources, within which such data and/or resources are not inventoried in any way, locating specific data and/or resources for satisfying a specific information need becomes comparatively ever more difficult.

Within this context, synchronous collaborative information retrieval ('SCIR') is the study of systems to support two or more people searching together in order to satisfy a shared information need.

Remote SCIR

Remote synchronous collaborative information retrieval systems enable a plurality of users, remote from one another, to collaboratively search and browse distributed environments, for instance the Internet. Early examples of synchronous collaborative information retrieval tools were built using a distributed architecture, wherein software enabled communication across groups of remote users. These systems often required users to log into a particular service or may require users to use particular applications in order to facilitate collaboration. Examples of early collaborative browsing environments have included:

- the GroupWeb system (Greenberg and Roseman, 1996), which was built upon the GroupKit groupware toolkit and wherein several users could log onto a collaborative browsing session in which the web browser was used as a group "presentation tool";
- the W4 browser (Gianoutsos and Grundy, 1996), which extended the GroupWeb system to allow users to browse the web independently, whilst viewing all pages viewed by other users, dialoguing electronically with each other, sharing documents deemed relevant;
- the CSCW3 application (Gross, 1999), which used a chatroom metaphor wherein users in the same room could dialogue electronically and couple their browsers in order to support synchronized browsing; and
- the MUSE system (Krishnappa, 2005) employed a similar approach, whereby two users could explore the web and share results and chat using separate windows.

Laurillau and Nigay (2000) identified four types of navigational support in a collaborative browsing system:

(1) "Guided tour": the guide navigates the web, and the other members of the group follow synchronously.
(2) "Relaxed navigation": an open group without a leader, wherein each member explores independently.
(3) "Coordinated navigation": no leader, but with each member is given a subset of the information space to explore.
(4) "Cooperative navigation": the leader decides about partitioning the information space, group members work independently and, at the end of the session, the group leader coordinates the results.

The systems described above can be classified into the first two of these navigational types. Laurillau and Nigay (2000) developed the Co-Vitesse system to support all four types of navigation and a chat facility was also included to support communication. In order for a collaborative system of type 3 or 4 to be effective, an appropriate division of labor is required. Some proposed approaches to a division of labor were discussed by Diamadis and Polyzos (2004), Foley et al. (2006), Morris and Horvitz (2007) and included initially splitting the search task corpus and dividing it amongst the users at the start, or dynamically dividing search results amongst users in real-time.

SearchTogether (Morris and Horvitz, 2007) is a recently-developed prototype system, which incorporates many synchronous and asynchronous tools to enable a small group of remote users to work together for satisfying a shared information need. SearchTogether was built to support awareness of others, division of labor and persistence of the search process. Awareness of others was achieved by representing each group member with a screen name and photo: each time a team member performs a new search, the query terms would be displayed in a list underneath their photo and this list was interactive. By clicking on a search query, a user could see the results returned for this query, and this reduced the duplication of effort across users. When visiting a page, users could also see which users had previously visited this page, and this information was also displayed in the results of a search, thereby enabling users to skip a page viewed by others. Users could also provide ratings for pages using a "thumbs-up" or "thumbs-down" metaphor. Support for division of labor was achieved through an embedded text chat facility, a recommendation mechanism and a split search and multi-search facility. Using split search, a user could divide the results of their search with a collaborating searcher and, using multi-search, a search query could be submitted to different search engines, each associated with different users. Persistence was achieved by allowing all parts of the system to be saved and re-used at a later date, including search queries and results, recommendation and chats.

The Adaptive Web Search (AWS) system proposed by Dalal (2007), represented a combination of personalized, social and collaborative search. The system was a type of meta-search system in which users could search for data or resources using multiple search engines, and maintain a preference vector for a particular engine based on their long-term and short-term search contexts, user goals and geographic location. Users could perform social searching by having their preference vector influenced by others depending on a level of trust.

An example of commercial application of synchronous collaborative information retrieval is available in the popular 'Windows Live™ Messenger' (2007), an instant messaging service. During a chat session, users can search together by having the results from a search displayed to each user involved in a chat. In a somewhat similar manner, Netscape Conferencer™ (2007) allows multiple users to browse the web together, using WYSIWIS views wherein one user controls the navigation and chat facilities, and wherein whiteboards facilitate communication.

Recent advances in ubiquitous computing devices such as mobile phones and personal digital assistants ('PDAs') have led researchers to begin exploring techniques for spontaneous collaborative search. The motivation behind these systems is that, as information and communications technology becomes ever-ubiquitous, meetings and/or goals between users can be enriched whenever users need to search for data or resources during the course of a meeting (for example, information in relation to a topic of conversation), since such a search can be performed collaboratively. Maekawa et al. (2006) developed a system for collaborative web browsing on mobile phones and PDAs, and WebSplitter (Han et al., 2000) was a similar system for providing partial views to web pages across a number of users and, potentially, across a number of devices available to a user (e.g. laptop, PDA).

From the above, it can be observed, that most of the development in synchronous collaborative information retrieval systems has concentrated upon improving group effectiveness, through providing awareness of other searchers' activities: this feature enables collaborating searchers to coordinate their activities, in order to support a division of labor and sharing of search knowledge amongst collaborators. Division of labor in these systems is generally achieved by either showing the pages visited or bookmarked by other users. The sharing of knowledge in these systems is generally supported by providing facilities for communications like chat systems and shared whiteboards for brainstorming.

A common feature of the above systems is that they all require users to explicitly log onto a service to support collaborative searching. However, systems have been developed, for making users who are browsing the web aware of others with similar information goals. The motivation behind the development of these systems is that, due to the ever-increasing number of people perusing the Internet, there is a high probability when searching the web for information, that another user is searching for the same information at the same time, whereby providing users with an awareness of others searching for the same information enables a spontaneous collaborative searching session, which can benefit both users.

Co-Located SCIR

Recently, the development of new computing devices has facilitated the development of co-located collaborative information retrieval tools. Particularly, advances in single display groupware (SDG) technology (Stewart et al., 1999), have enabled the development of collaborative search systems for the co-located environment. The main advantage of such systems is that they improve the awareness of collaborating searchers, by bringing them together in a face-to-face environment. Increased awareness can enable both a more effective division of labor and a greater sharing of knowledge. Single display groupware systems are gaining in popularity and, recently, Microsoft® developed a tabletop system labeled "Surface" (Microsoft Surface™, 2007) which will surely promote further exploration into this novel research area.

Let's Browse (Lieberman et al., 1999) was one of the earliest amongst such developments, and was a co-located web-browsing agent, which enabled multiple users standing in front of a screen (a display projected onto a wall) to browse the web together, based on their user profiles: a user profile in the system consisted of a set of weighted keywords (tf-idf weighting) of their interests and was built automatically from extracting keywords from both the user's homepage and those around it, using a breadth-first search. Users wore electronic badges so that they could be identified as they approached the screen. A collaborating group of users using Let's Browse were shown a set of recommended links to follow from the current page, ordered by their similarity to the aggregated users' profiles.

The tangible interface system developed by Blackwell et al. (2004), allowed a group of users to perform "Query-By-Argument", whereby a series of physical tokens with RFID transmitters could be arranged on a table to develop a team's query. A team received a list of documents in response to a query and each member chose documents related to their interests. Users could highlight parts of the documents that were relevant, and this relevance feedback could be used to modify term weights for query expansion using Robertson's offer weight. In this way, the process of information retrieval became a by-product of interactions amongst users.

The TeamSearch system developed by Morris et al. (2006), enabled a group of users collaborating around an electronic tabletop to sift through a stack of pictures, using collaborative Boolean query formulation. The system enabled users to locate relevant pictures from a stack, by placing query tokens on special widgets, which corresponded to predefined metadata categories for the images. The TeamSearch system used, as its input device, a DiamondTouch electronic tabletop system developed by Mitsubishi Electric Research Labs ('MERL') (Dietz and Leigh, 2001), which is a multi-user touch-sensitive tabletop interface device enabling multiple users to sit around the device and interact with objects projected onto the table from an overhead projector, using their fingers.

DiamondSpin (Shen et al., 2004) is an interface toolkit, which enables development of applications on the DiamondTouch (or another tabletop device) and allows for objects on the screen to be moved, resized and rotated. Fischlár-DiamondTouch was a multi-user video search application developed at the Centre For Digital Video Processing at Dublin City University (Smeaton et al., 2006), which allowed two users to collaborate in a face-to-face manner in order to interact with a state of the art video retrieval application, Fischlár (Smeaton et al., 2001). Collaboration in Fischlár-DiamondTouch was mediated at the interface level through various awareness widgets, however the system still communicated with a standard single-user search engine. In an effort to improve collaborative search effectiveness, this system was further developed as "Cerchiamo" by the 2007 FXPAL TRECVid team (Adcock et al., 2007), wherein the two users would work together under respective, predefined roles of "prospector" and "miner", for finding relevant shots of videos. The role of the prospector was to locate avenues for further exploration, while the role of the miner was to explore these avenues.

SCIR Parameter Sharing

Early SCIR systems provided various awareness cues: by providing these cues, these systems enabled the collaborating searchers themselves to coordinate their activities in order to achieve a certain division of labor and sharing of knowledge. However, coordinating activities amongst users can be troublesome by requiring too much of a user's cognitive load (Adcock et al., 2007). Recent systems support a more system-mediated division of labor thorough dividing the results of a search query amongst searchers (Morris and Horvitz, 2007) or defining searcher roles (Adcock et al., 2007). Sharing of knowledge in these systems is generally realized in the form of awareness cues to others, such as the bookmark lists that allow users, as they find relevant material, to store these for later consolidation and discussion amongst users. However, this information from other users' previous relevance judgments, is frequently used in asynchronous collaborative information retrieval to improve a new user's search, either through collaborative filtering, or community re-ranking. Synchronous collaborative information retrieval systems, rather than re-using this explicit relevance information in the search process, simply use it as a bookmark.

An example will make this current limitation clearer: suppose two users are searching together to satisfy a shared information need using a SCIR system described above. As user A finds documents which he believes are relevant to the task, he saves them to a "bookmarked" area so that user B can see these documents. What user A is doing is providing explicit relevance judgments to the search engine. Relevance judgments garnered from users can provide performance improvements by reformulating the query in order to reflect this extra relevance information. At present, SCIR systems do not use this new relevance information directly within the search process for re-formulating a user's query: instead, this new relevance information is used simply as a bookmark, i.e. a placeholder where users can save their results during a search. No attempt is made to utilize this relevance information during the course of a SCIR search to improve the quality of ranked lists returned to each collaborating searcher. As a consequence the collaborating group does not see the benefit of this explicit relevance information in their ranked lists.

Asynchronous systems rely on the building of large user-item matrices in order to generate predictions related to a long-standing information need. A critical mass of ratings is required for these systems to be effective, and ratings are made on items through a "voice of the masses" approach. Although asynchronous collaborative information retrieval systems support user collaboration, their focus is still very much in line with traditional information retrieval systems: they are motivated by improving a single user's search.

On the contrary, in a synchronous domain, collaboration is spontaneous and over a shorter period of time: therefore, a much smaller amount of relevance judgments are available in order to improve a search, and this relevance information needs to be re-used quickly in order to benefit each searcher before the search session ends. Such synchronous systems are more focused, users are explicitly searching together to satisfy a common information need, and there is therefore less need for a nearest-neighbor approach, since all collaborating searchers can be considered nearest-neighbors.

Synchronous Collaborative Information Retrieval systems, on the other hand, represent a significant shift in motivation from these traditional IR systems. The focus of these systems is not on supporting a single user in a search task, but actively supporting a group of users in a search task. This motivational shift requires a rethink in the techniques used. For example, whereas a collaborative filtering system attempts to recommend items to a user based on the fact that previous users have found the item relevant, a synchronous collaborative information retrieval system may, on the other hand, decide to remove this item from other searchers' retrieved results, in order to reduce redundancy and improve group effectiveness.

In the Let's Browse (Lieberman et al., 1999) system, multiple user profiles were aggregated in a browsing session: this information was however simply used as a means to select which pages to browse to next, and a user profile would be constructed off-line based on terms extracted from their homepage and surrounding pages, whereby not applicable to a real-time search session wherein user profiles can change depending on their current search.

The recently proposed approach by Adcock et al. (2007) divides the searching task for two co-located users into two specialized and complementary roles. Feedback from the user is used to influence results passed to them from the other. However in a distributed environment like the web this specialization may be difficult and furthermore the relevance assessments are not used directly in the search process but instead are used as a means to order results for presentation and for suggesting possible query terms.

A recently proposed approach by Dalal (2007) outlines how a user's personalized profile can be combined with others in order to support social searching. Dalal describes how a trust scalar can be employed to modify the influence of different users or groups on a user's preference vector. However at present this preference vector is used simply as a means to select a particular meta search engine to use (at present the system uses country-specific searches), and no details are given as to how a user's profile is constructed beyond that it consists of "short-term and long-term contexts".

Improving the effectiveness of SCIR systems is known to be achievable through both the optimal division of a search task amongst collaborating users, wherein each user of a group performs a subset of the overall search task, and the optimal feedback to each user of the group, whereby group members may benefit from any relevant material found by others within the search process. Early SCIR systems were therefore focused on improving the awareness of each user in the group of the progress achieved by the other users.

A problem to be solved in SCIR systems is therefore how to allow two (or more) users to search effectively together, by having the search system continually making use of relevance judgments provided by each user in a single synchronised collaborative search session, so as to improve the quality of the respective search results for each of the two (or more) users in real time. Methods and systems, which can solve this problem, are therefore highly desirable, in particular as collaborative working environments are emerging wherein shared working activities are physically encouraged and allowed, for instance Microsoft's Surface which supports 2 or more people jointly interacting with a single terminal for shared of computing tasks, for instance the locating and retrieval of data or resources.

There is a need to develop effective techniques to exploit the relevance information provided by searchers during a synchronous collaborative information retrieval session.

SUMMARY OF THE INVENTION

We have developed effective techniques for using this relevance information within a synchronous collaborative information retrieval task in order to improve the performance of the collaborating group. We have investigated how such a technique could operate within a state-of-the-art synchronous collaborative information retrieval system, which we will now outline.

According to embodiments of the present invention, methods and a system are provided to synchrously combine the respective relevance information of multiple collaborating users within a search task in real time, whereby the search task results shown to each collaborating user can be enhanced with combined relevance information so as improve the performance of the collaborating group.

According to an aspect of the present invention, a method for locating data in a distributed data environment is provided, wherein at least two users in the environment share a common data requirement, each user submitting a data locating query, each user receiving a query result, each user inputting respective relevance feedback data in response to the received query result, the method comprising the further steps of combining the respective relevance feedback data in real time, and processing data locating queries with the combined respective relevance feedback data.

The steps of submitting a data locating query, receiving a query result, inputting respective relevance feedback data in response to the received query result, combining the respective relevance feedback data in real time, and processing data locating queries with the combined respective relevance feedback data may be performed in a synchronous manner. The steps of submitting a data locating query, receiving a query result and inputting respective relevance feedback data in response to the received query result by each user, may be performed at a same shared user terminal or at respective user terminals.

The method may comprise the further step of storing a respective user profile for each of the said at least two users, each user profile having term relevance statistics. The step of combining the respective relevance feedback data may comprise the further step of extending proportions of a term using a linear combination of each user's relevance statistics for the said term. The step of extending proportions of a term further may comprise the further step of using a value α for controlling the effect of each user's relevance information, and that value α may be $$\frac{1}{U}$$

for a group consisting of U users. The step of extending proportions of a term may comprise the further step of using a value β for weighing the controlled effect of each user's relevance information. The method may comprise the further step of assigning an authority value to each user's relevance statistics.

According to another aspect of the present invention, a system for locating data in a distributed data environment is provided, the environment comprising a plurality of network-connected data terminals and wherein at least two users share a common data requirement, the system comprising at least one of the network-connected data terminals having means for each of the at least two users to submit a data locating query, means for each of the at least two users to receive a query result, means for each of the at least two users to input respective relevance feedback data in response to the received query result, means for combining the respective relevance feedback data in real time, and means for processing data locating queries with the combined respective relevance feedback data.

The means for combining the respective relevance feedback data in real time may be a user profile aggregator.

According to a further aspect of the present invention, a user terminal for locating data in a distributed data environment is provided, which comprises means for each of at least two users to submit a data locating query, means for each of the at least two users to receive a query result, means for each of the at least two users to input respective relevance feedback data in response to the received query result, means for combining the respective relevance feedback data in real time, and means for processing data locating queries with the combined respective relevance feedback data.

According to yet another aspect of the present invention, a data-carrying medium storing computer-readable instructions for locating data in a distributed data environment is provided, wherein the instructions, when read by a computer, configure the computer to perform any of the methods described herein.

DETAILED DESCRIPTION OF THE PREFERRED EMBODIMENTS

Figure 1:
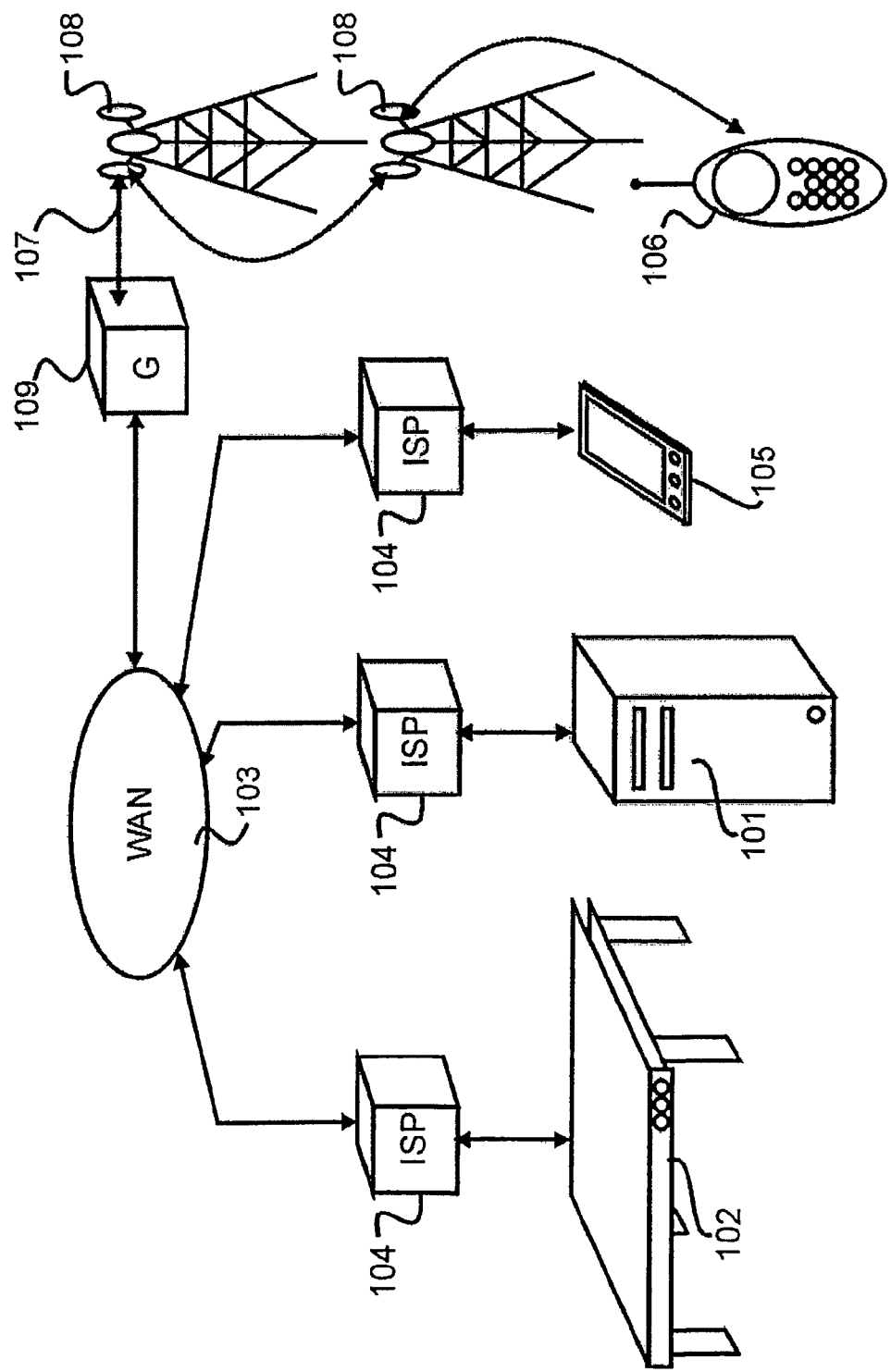
FIG. 1 provides a graphical illustration of an environment, including a plurality of networked data processing terminals, in which the present invention may be embodied.

FIG. 1 depicts an environment consisting of networked computerized systems, including a plurality of data processing terminals, wherein various embodiments of the present invention may be implemented.

Figure 4:
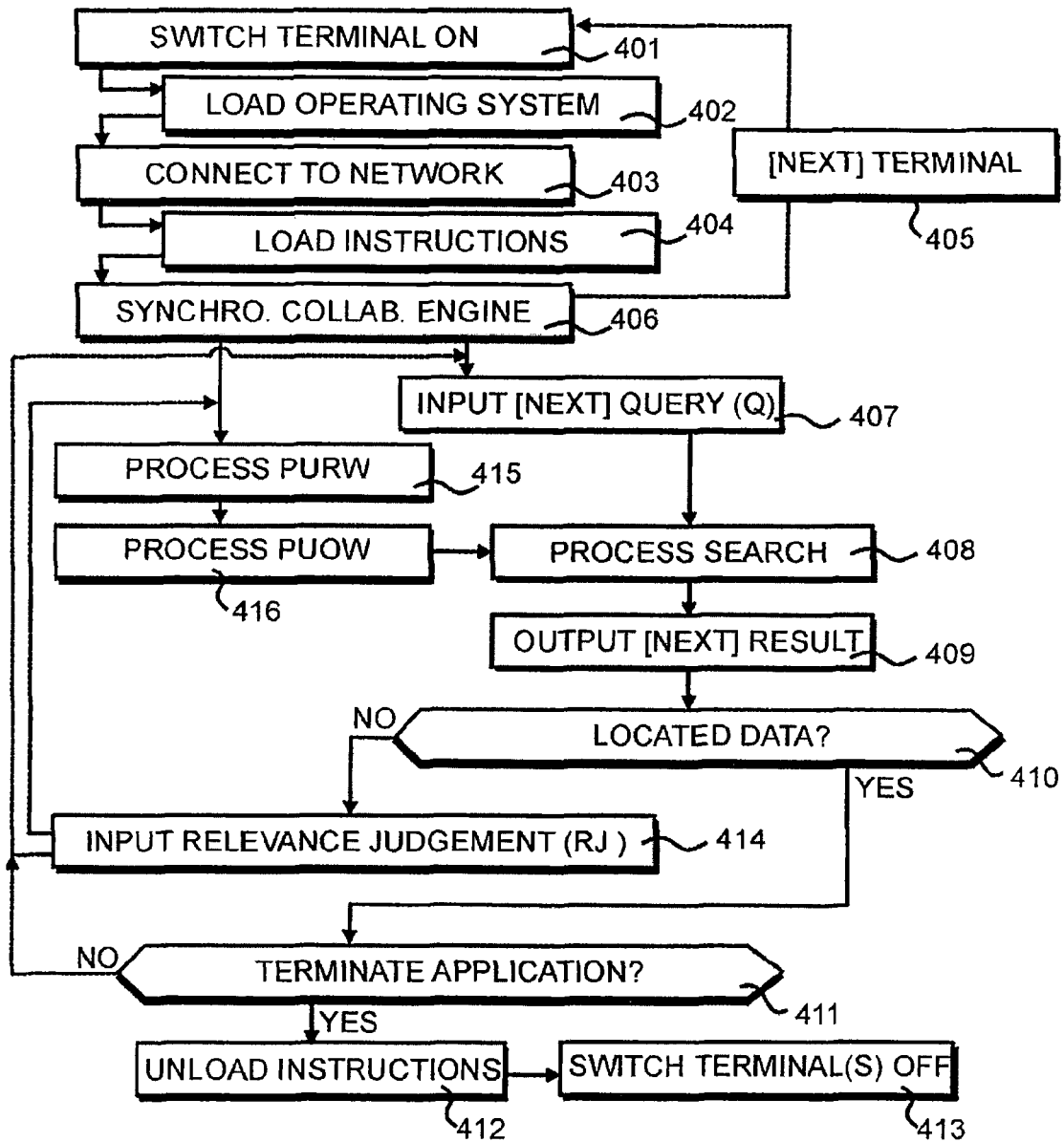
FIG. 4 details the steps according to which at least two data processing terminals, such two or more of the terminals shown in FIGS. 1 and 2, would operate according to an embodiment of the present invention, which is illustrated in FIG. 3.

Amongst the plurality of data processing terminals, a first data processing terminal 101 is configured according to a first embodiment of the present invention shown in further detail in FIG. 4, and is connected with further data processing terminals over a variety of wired and wireless networks, each of which may or may not be configured according to an embodiment of the present invention or another, depending upon whether the said further data processing terminals are used for SCIR or are data and/or resources repositories.

In the example, one of the further data processing terminals is terminal 102, which is a DiamondTouch electronic tabletop system configured for simultaneous operation by one or more concurrent users. Terminal 102 is configured according to another embodiment of the present invention shown in further detail in FIG. 6, although it will be readily apparent to those skilled in the art that the second terminal may be configured according to the first embodiment of the present invention, particularly if it is to be operated by a single user.

In the embodiment shown, each of terminals 101 and 102 are connected to a Wide Area Network (WAN) 103, of which the Internet is an example, via respective Internet Service Provider (ISP) 104.

Terminals 101 and 102 may also be connected via a network with at least a third data processing terminal 105. In the example, third terminal 105 is a networked personal computing device such as a personal digital assistant ('PDA') or laptop computer, and it will be readily apparent to those skilled in the art that the third terminal may be any type of personal data processing device capable of interfacing a network, receiving user input and forwarding same over the network. In the embodiment shown, terminal 105 is connected to the Wide Area Network (WAN) 103 via another (or the same) ISP 104 as terminals 101 and 102.

Terminals 101, 102 and 105 may also be connected via a network with at least a fourth data processing terminal 106. In the example, fourth terminal 106 is a networked mobile computing device such as a mobile telephone handset, and again it will be readily apparent to those skilled in the art that the fourth terminal may be any type of personal data processing device capable of interfacing a network, receiving user input and forwarding same over the network.

In the embodiment shown, terminal 106 is connected to the Wide Area Network (WAN) 103 via a low-bandwidth network connection Global System for Mobile Communication ('GSM') wireless network, or a higher-bandwidth General Packet Radio Service ('GPRS') wireless network, or a yet higher-bandwidth Universal Mobile Telecommunications System ('UMTS') wireless network 107.

Fourth terminal 106 receives data from terminal 101 and transmits data back to terminal 101 as a digital signal over wireless network 107, wherein said signal is relayed respectively to or from the terminals 101, 106 by the geographically-closest communication link relay 108 of a plurality thereof, at least one of which is connected with a remote gateway 109 providing an interface with the WAN 103. Gateway 109 is for instance a communication network switch and provides protocol conversion if required, for instance because terminal 106 transmits data to terminal 101 which is formatted according to a cellular transmission protocol and, inversely, terminal 101 transmits data to terminal 106 which is formatted according to a WAN transmission protocol.

Thus, the potential exists for data exchange between any of terminals 101, 102, 105 and 106 by way of the WAN 103 and wireless network 107, interfaced by ISPs 104 and gateway 109. It will however be readily apparent to those skilled in the art that the above environment is provided by way of example only, and that the present invention may be embodied in any network comprising devices connected thereto exchanging data encoded as described hereinbelow.

Figure 2:
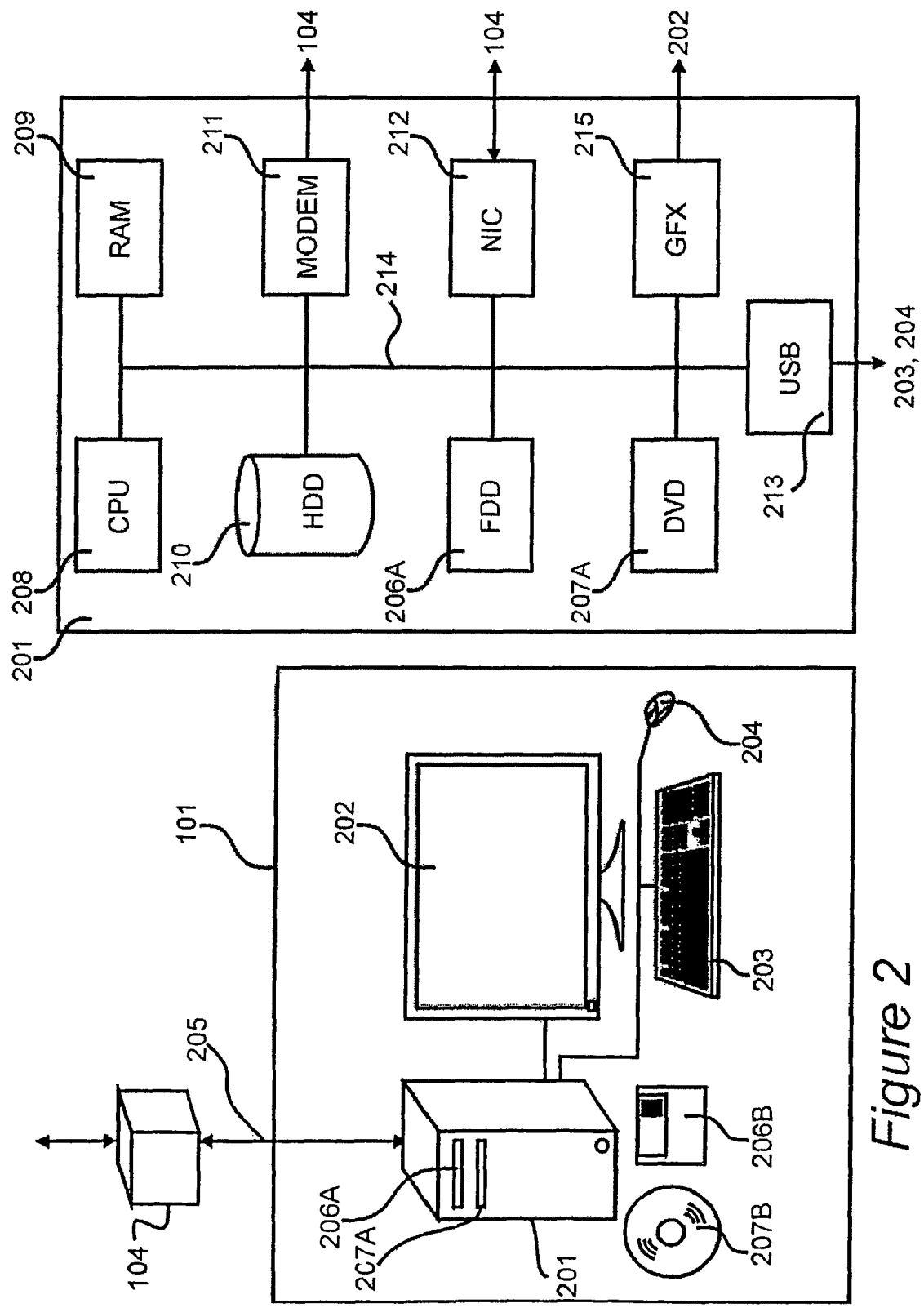
FIG. 2 provides a graphical illustration of the hardware components of a data processing terminal shown in the environment of FIG. 1.

An example of terminal 101 shown in FIG. 1 is provided in FIG. 2. Terminal 101 is a computer terminal configured with a data processing unit 201, data outputting means such as video display unit (VDU) 202, data inputting means such as a keyboard 203 and a pointing device (mouse) 204 and data inputting/outputting means such as WAN connection 205, magnetic data-carrying medium reader/writer 206A and optical data-carrying medium reader/writer 207A. Reader/writer 206A preferably reads data and instructions for the processor described herein from magnetic media such as a floppy disk 206B and writes data processed by said processor thereto, and reader/writer 207A preferably reads data and instructions for said processor from optical media such as DVD+/−R/RW 207B and writes data processed by said processor thereto.

Within data processing unit 201, a central processing unit (CPU) 208, such as a Core™ 2 Duo processor manufactured by the Intel® Corporation, provides task co-ordination and data processing functionality. Instructions and data for the CPU 208 are stored in main memory 209 and a hard disk storage unit 210 facilitates non-volatile storage of data and sets of instructions for CPU 208. A modem 211 provides a first means for a wired connection to the ISP 104, for instance if the connection 205 is effected by a low-bandwidth dial-up service provider. A network interface card (NIC) 212 provides a second means for a wired connection to the ISP 104, for instance if the connection 205 is effected by a high-bandwidth cable modem (not shown). A universal serial bus (USB) input/output interface 213 facilitates connection to the keyboard and pointing device 203, 204 and may provide third means for a wired connection to the ISP 104, for instance if the connection 205 is effected by a high-bandwidth digital subscriber line (DSL) modem (not shown). All of the above devices are connected to a data input/output bus 214, to which said magnetic data-carrying medium reader/writer 206 and optical data-carrying medium reader/writer 207 are also connected. A video graphics adapter 215 receives CPU instructions over said bus 214 for outputting processed data to VDU 202, particularly the respective graphical user interface of any set of data processing instructions, provided for facilitating interaction between a user and the terminal. Data processing unit 201 is of the type generally known as a compatible Personal Computer ('PC'), but may equally be any device configured with data inputting, processing and outputting means providing at least the functionality described above.

Embodiments of the present invention establish methods to combine the respective relevance information of multiple users within an information retrieval process, which may be performed or otherwise implemented in the technical environment and its network(s) of terminals as described above. An overview of the information retrieval process is provided hereafter. The purpose of an information retrieval system is to allow users to satisfy an information need by locating and retrieving relevant data, resources and/or information from a repository location. Typical user interactions with an information retrieving system are performed through an online search engine, such as Google™. Users may generally begin their interaction with the search engine by providing a term-based query, which is then compared against the data, resources and/or information repository for finding matching data, resources and/or information in accordance with the retrieval model in use. Data, resources and/or information, often in the form of documents, are assigned a matching score. The three most common models of retrieval are:

(1) The Boolean Model
(2) The Vector Space Model (Salton et al., 1975) and
(3) The probabilistic model (Maron and Kuhns, 1960; Robertson and Sparck Jones, 1976; van Rijsbergen, 1979)

Matching documents are then ranked by their associated matching score, and returned to the user. Information retrieval is most often an iterative process: a user may begin their search with vague notions of their information need, and often this may result in a poor initial query being issued to the search engine. Several techniques have been proposed in order to improve retrieval results, one such approach is known as relevance feedback: by using relevance feedback, a user can indicate, on an initial ranked list, those items of relevance to them, and the search engine can then use this additional information for improving the results subsequently returned to the user.

Despite the success of modern online information retrieval systems, often it is difficult for an information retrieval system to locate any documents relevant to a query. Frequently, this can be attributed to a user's poor expression of their information need, as expressed through their query issued to the search engine. Studies have shown how the length of most web queries often amounts to between 1 and 3 words (Spink et al., 2002; Nielsen, 2001). Relevance feedback is an inexpensive and iterative query reformulation technique, which has been proven to improve the effectiveness of ranked list over an initial query (Cleverdon and Keen, 1966; Salton, 1989; Salton and Buckley, 1990; Harman, 1992; Haines and Croft, 1993; Buckley et al., 1994).

Users can provide feedback to the system either explicitly, for instance by clicking a button on a user interface, or implicitly, for instance by observing a user's interactions and deriving inferences from these observations. The search engine uses these identified relevant documents to improve the initial query formulation, in order to make the new query look for more relevant material and less irrelevant material: relevance feedback improves an initial query formulation in two ways, by adding important terms from identified relevant documents through a process known as query expansion, and by attaching a weight to all query terms for emphasizing important terms and de-emphasizing trivial terms through a process known as 'term reweighing'. The largest improvement to a query is generally attributed to query expansion, however the combination of both expansion and reweighing provides the best performance increase over an initial ranked list (Harman, 1992).

Within the third (3) probabilistic model, the relevance feedback processes of query expansion and term reweighing are treated separately. As outlined by Robertson (1990), the process of query expansion and term reweighing should be treated separately as they attempt to answer different questions. In particular, query expansion attempts to answer the questions 'How much will adding this term to the query benefit the query's performance?' and term reweighing attempts to answer the question 'How much evidence does the presence of this term provide for the relevance of this document?'

All terms from all known relevant documents are candidates for expanding the original query. Robertson (1990) proposed the offer weight (sometimes refereed to as term selection value) in order to rank terms for expansion:

$$ow_i = r_i \times rw_i \qquad (1.1)$$

where r<sub>i</sub> is the number of known relevant documents in which term i occurs, and rw<sub>i</sub> is the relevance weight of term (see Equation 1.2 below).

Terms are ranked according to the original offer weight and the top N terms are appended to the originally query entered by the user (10 to 20 is considered a reasonable figure, per Robertson and Spärck Jones, 1997). Having expanded the user's original query by adding the top terms, term reweighing can be applied to all query terms using the relevance weighting formula at retrieval time:

$$rw_i = \log \frac{\left(\frac{r_i}{R}\right)\left(1 - \frac{n_i - r_i}{N - R}\right)}{\left(\frac{n_i - r_i}{N - R}\right)\left(1 - \frac{r_i}{R}\right)} \qquad (1.2)$$

Figure 3:
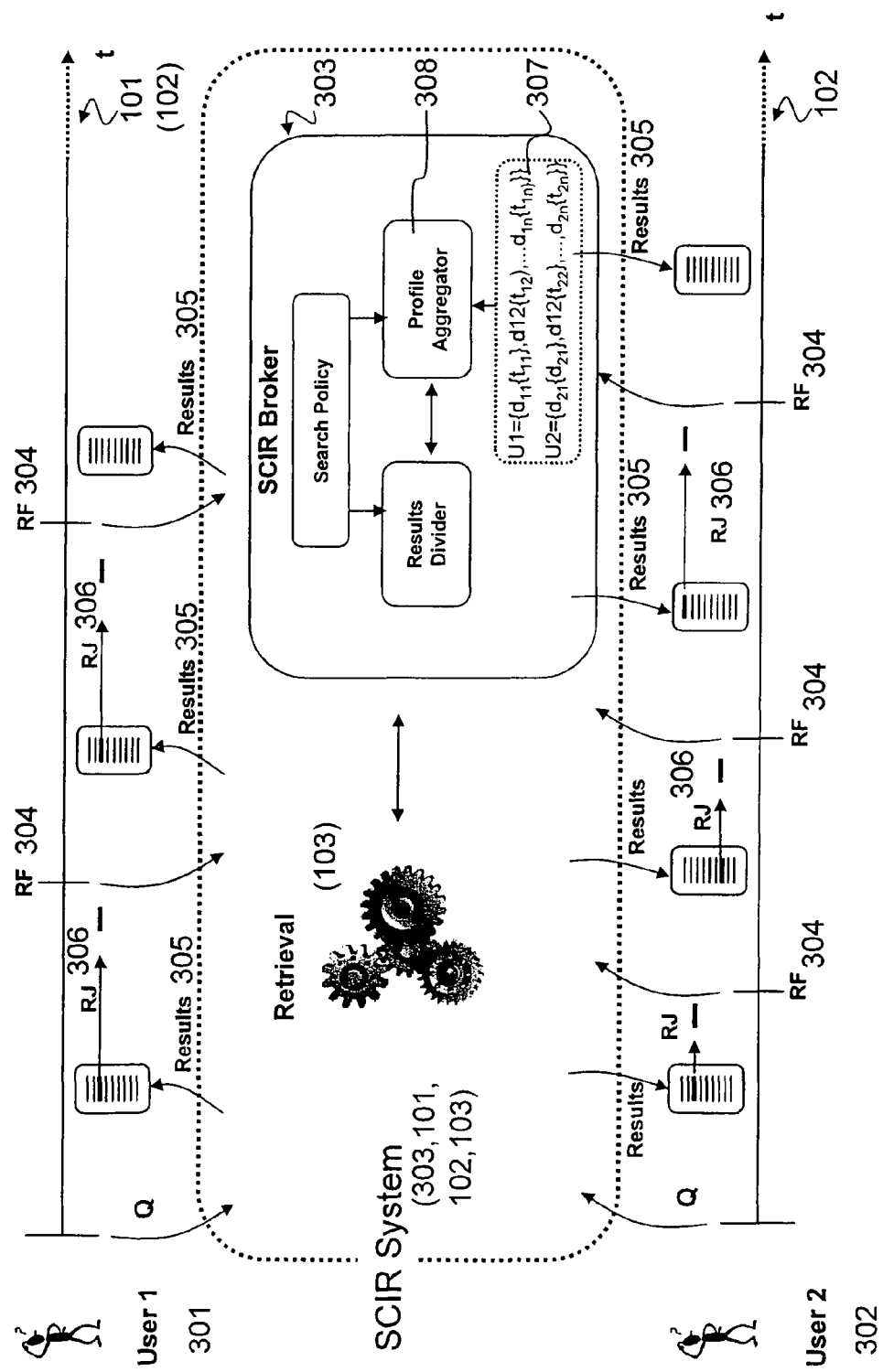
FIG. 3 provides a logical illustration of a preferred embodiment of the present invention.
Figure 6:
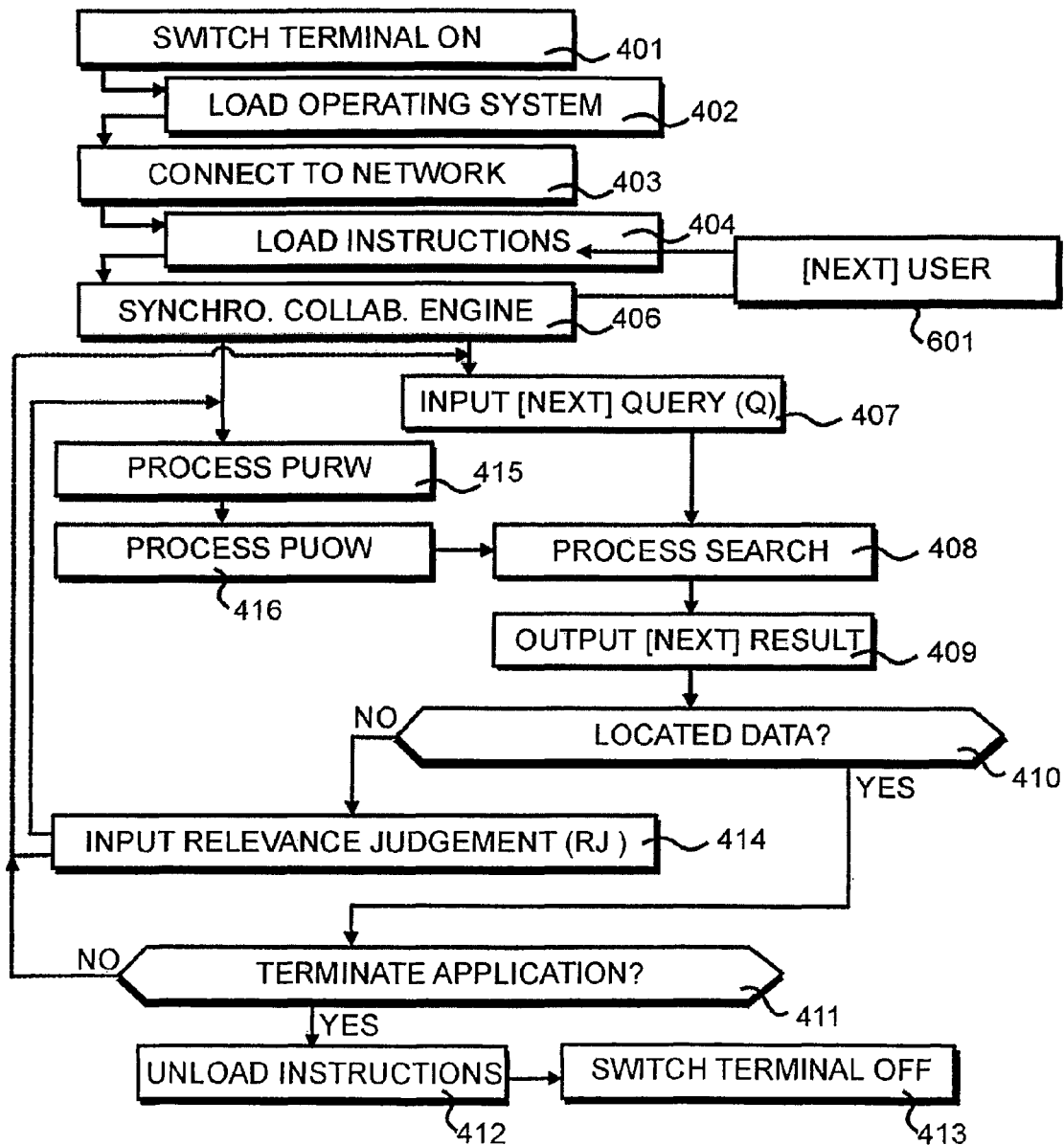
FIG. 6 details the steps according to which a data processing terminal would operate according to another embodiment of the present invention.

A conceptual representation is shown in FIG. 3, of how at least two users 301, 302, either respectively operating terminal 101 and 102, both configured according to a first embodiment of the present invention shown in FIG. 4, or both operating terminal 102 configured according to another embodiment of the present invention shown in FIG. 6, may collaborate using a synchronous collaborative information retrieval engine 303 according to an embodiment of the present invention. The interactions of these two users 301, 302 with the SCIR engine 303 are shown along a respective time line for each user. It should be noted that the two timelines represent the same moment in time, since the session is synchronous: in FIG. 3, the time lines have been separated for each user 301, 302 for illustrative purposes, but the interactions of each user could be plotted on the same time line.

During a synchronous collaborative search, if users 301, 302 are providing relevance feedback 304 to the search system 303 on the basis of the results 305 returned for their searches, then at any stage in the search process, each searcher 301, 302 will have their own set of relevance judgments 306.

As users 301, 302 are engaged in a synchronous search task, wherein they are searching to satisfy the same information need, then when a user 301 or 302 invokes a relevance feedback procedure, this procedure should make use of the relevance judgments 306 made by each of searchers 301, 302 thus far, in order to alter the results returned to the searcher, and thereby improve the performance of the group 301, 302.

As can be observed in FIG. 3, as each user 301, 302 makes a relevance judgment 306, their user profile 307 is updated, it is the job of a profile aggregating module 308 to combine the relevance judgments 306 from multiple users 301, 302 in order to alter the search results 305 shown to each collaborating searcher 301, 302, and this represents the present inventive concept.

In known systems, a relevance feedback algorithm assumes that only a single user has provided relevance information: in order to maximize the effectiveness of the relevance information 306 provided by multiple users 301, 302, and support the combination of multi-user relevance information according to embodiments of the present invention, the relevance feedback technique needs to be extended and the following section details how to incorporate multi-user relevance information in the relevance feedback process.

Incorporating Relevance Judgments of Multiple Users

The relevance feedback process uses all available relevance information for a term, in order to assign it a score for both query expansion and term reweighing. If relevance information 306 is obtained from multiple co-searchers 301, 302, then a method need to be developed to incorporate this extra relevance information from each user into the relevance feedback process. This method shall be referred as partial-user weighting, as the evidence for relevance or non-relevance of a term is composed of the combined partial evidence from multiple users. The derivation for the partial-user relevance weight and partial-user offer weight will now be outlined.

From Robertson and Spärck Jones (1976), the probability of relevance of a term is defined as:

$$w(i) = \log \frac{p(1-q)}{q(1-p)} \qquad (1.3)$$

where p=probability that a document contains term i given that it is relevant q=probability that a document contains term i given that it is non-relevant The appropriate substitutions for p and q are the proportions:

$$p = \frac{r_i}{R} \qquad (1.4)$$

$$q = \frac{n_i - r_i}{N - R} \qquad (1.5)$$

where r<sub>i</sub>=Number of relevant documents in which term i occurs

R=Number of identified relevant documents n<sub>i</sub>=Number of documents in the collection in which term i occurs N=Number of documents in the collection The probability that a document contains term i given that it is relevant, p, is equal to the proportion of all relevant documents in which the term i occurs. The probability that a document contains term i given that it is non-relevant, q, is equal to the proportion of all non-relevant documents that contain the term.

Applying these substitutions to equation 1.3, the standard relevance weighting formula becomes:

$$rw(i) = \log \frac{\left(\frac{r_i}{R}\right)\left(1 - \frac{n_i - r_i}{N - R}\right)}{\left(\frac{n_i - r_i}{N - R}\right)\left(1 - \frac{r_i}{R}\right)} \quad (1.6)$$

Assume that in a collaborative search session includes a number U of collaborating users collaboratively searching, then the proportions for p and q, in equations 1.4 and 1.5 respectively, can be extended as follows:

$$p = \sum_{u=0}^{U-1} \alpha_u \frac{r_{ui}}{R_u} \quad (1.7)$$

$$q = \sum_{u=0}^{U-1} \alpha_u \frac{n_i - r_{ui}}{N - R_u} \quad (1.8)$$

where $n_i$ and N are as before $r_{ui}$=Number of relevant documents identified by user u in which term i occurs $R_u$=Number of relevant documents identified by user u $\alpha_u$=Determines the impact of user u's proportions on the final term weight, and $$\sum_{u=0}^{U-1} \alpha_u = 1$$

Therefore, the proportions have been have extended using a linear combination of the relevance statistics 306 of each user 301, 302. Using this approach, the probability that a document contains term i, given that it is relevant, is equal to the sum of the proportions for relevance from each user. The probability that a document contains term i, given that it is not relevant, is equal to the sum of the proportions of non-relevance. Each of these values is multiplied by a scalar constant α, which can be used to vary the effect of each user's proportion in the final calculation, and a default value $$\frac{1}{U}$$

can be used to consider all users equally.

One important consideration when combining relevance information from multiple users, is what to do when the term does not appear in each user's profile (i.e. when r=0 for some user). For example, when contemplating query expansion, a possible solution may involve considering only those terms, which occur in each user's profile: whereby terms should be disregarded as expansion terms, unless they occur in each user's profile. This important consideration will be explored in detail below. For now, a user's proportions for a term may be incorporated regardless of whether the term appears in any of the user's relevance judgments 306. Specifically, as r=0 for a given user 301, 302, a term will receive a relevance proportion, p, of $$0\left(\frac{0}{R}\right)$$

and a non relevance proportion, q, of $$\frac{n}{N - R},$$

from a user who has not encountered the term.

Using this approach, a term that has not occurred in any relevant documents (when very few relevant documents have been identified by the user) will receive a higher weight than a term, which has occurred in no relevant documents (when many relevant documents have been identified by the user). This approach seems appropriate, in cases wherein a term has not been encountered, the weight of which should yet be greater in a small amount of relevant documents than if many documents had been examined and the term still had not been encountered: there is a greater amount of evidence that the term is non-relevant in the latter case, than the former case.

Applying the extended proportions of p and q, in Equations 1.7 and 1.8, respectively, to the probability of relevance from Equation 1.3, results in a partial-user relevance weight (PURW):

$$purw(i) = \log \frac{\left(\sum_{u=0}^{U-1} \alpha_u \frac{r_{ui}}{R_u}\right)\left(1 - \sum_{u=0}^{U-1} \alpha_u \frac{n_i - r_{ui}}{N - R_u}\right)}{\left(\sum_{u=0}^{U-1} \alpha_u \frac{n_i - r_{ui}}{N - R_u}\right)\left(1 - \sum_{u=0}^{U-1} \alpha_u \frac{r_{ui}}{R_u}\right)} \quad (1.9)$$

For practical implementation of the standard relevance weighting formula (equation 1.6), and to limit the errors associated with zeros such as dividing by zero, a simple extension is commonly used, which adds a constant to the values in the proportions. Applying the proportions suggested in Robertson and Spärck Jones (1976), known as the Jeffrey prior, to equation 1.9 results in:

$$purw(i) = \log \frac{\left(\sum_{u=0}^{U-1} \alpha_u \frac{r_{ui} + 0.5}{R_u + 1}\right)\left(1 - \sum_{u=0}^{U-1} \alpha_u \frac{n_i - r_{ui} + 0.5}{N - R_u + 1}\right)}{\left(\sum_{u=0}^{U-1} \alpha_u \frac{n_i - r_{ui} + 0.5}{N - R_u + 1}\right)\left(1 - \sum_{u=0}^{U-1} \alpha_u \frac{r_{ui} + 0.5}{R_u + 1}\right)} \quad (1.10)$$

The above has shown how the partial-user method may be applied to the standard relevance weighting formula. The application of the method to the offer weighting formula (1.11) below will now be considered.

$$ow_i = r_i \times rw_i \quad (1.11)$$

Using a linear combination approach, the formula's r value can be extended to include each collaborating user's r value, where the value can be used to weight the impact of each user's value to produce a partial-user offer weight (PUOW):

$$puow(i) = \left(\sum_{u=0}^{U-1} \alpha_u r_{ui}\right) \times purw(i) \quad (1.12)$$

where
$\alpha_u$=determines the impact of each users $r_i$ value on the final value, and $$\sum_{u=0}^{U-1} \alpha_u = 1$$

Table 1.1 below illustrates the result of applying the partial-user relevance weighting PURW and partial-user offer weighting PUOW to nine example terms, for a relevance feedback process involving two users 301, 302. In this simple example, both users have provided 2 relevance judgments 306 (i.e. R=2 for both users), the number of documents in the collection N is 100, and each term's n value is the same (i.e. n=10 for all terms) and =0.5 for both users.

The terms are ordered by the total number of relevance judgments 306, in which they occur. The result of applying the standard relevance weighting formula and offer weighting formula for both users is shown for each term, as is the result of applying the partial-user weighting scheme (PURW) and partial-user offer weighting scheme (PUOW). The relevance weighting and offer weighting values, assigned to terms, are different for both users, depending on the user's r value for the term. For example, user 301 ranks term t2 higher than t3, whereas for user 302, this ranking is reversed. When combining relevance information in the partial-user formulae, the term which occurs in each relevance judgment from both users, t1, receives the highest score. For terms where the users agree, i.e. the term occurs in the same number of relevance judgments 306 from both users (t1, t4, t9), the formula produces the same result as per the standard formulae. For terms where the users disagree (t2, t3, t5, t6, t7, t8), the formula produces an estimate based on a combination of the proportions.

TABLE 1.1

'partial user relevance weighting' example

| Term | $r_{1i}$ | $r_{2i}$ | $rw_1$ | $ow_1$ | $rw_2$ | $ow_2$ | purw | puow |
|---|---|---|---|---|---|---|---|---|
| t1 | 2 | 2 | 3.97 | 7.95 | 3.97 | 7.95 | 3.97 | 7.95 |
| t2 | 2 | 1 | 3.97 | 7.95 | 2.24 | 2.24 | 3 | 4.5 |
| t3 | 1 | 2 | 2.24 | 2.24 | 3.97 | 7.95 | 3 | 4.5 |
| t4 | 1 | 1 | 2.24 | 2.24 | 2.24 | 2.24 | 2.24 | 2.24 |
| t5 | 2 | 0 | 3.97 | 7.95 | 0.52 | 0 | 2.24 | 2.24 |

TABLE 1.1-continued

'partial user relevance weighting' example

| Term | $r_{1i}$ | $r_{2i}$ | $rw_1$ | $ow_1$ | $rw_2$ | $ow_2$ | purw | puow |
|---|---|---|---|---|---|---|---|---|
| t6 | 0 | 2 | 0.52 | 0 | 3.97 | 7.95 | 2.24 | 2.24 |
| t7 | 1 | 0 | 2.24 | 2.24 | 0.52 | 0 | 1.49 | 0.75 |
| t8 | 0 | 1 | 0.52 | 0 | 2.24 | 2.24 | 1.49 | 0.75 |
| t9 | 0 | 0 | 0.52 | 0 | 0.52 | 0 | 0.52 | 0 |

N = 100, n = 10 and R = 2 for both users 301, 302

The above section has outlined how the traditional probabilistic relevance feedback algorithm can be extended to include relevance information from multiple users 301, 302. What is proposed is a method for aggregating the evidence for a term's relevance or non-relevance, based on a linear combination technique. As will now be outline, this technique may itself be extended, in order to improve its effectiveness still further.

Authority Weighting

Linear combination is a method of weighted combination, which is commonly used in fusion literature. The technique operates by assigning a weighting to each source of evidence (e.g. a ranked list) prior to combination, for representing the influence which that source's value should bear in a combined value. Accordingly, the first embodiment presented above described a linear combination method, with an α value controlling the effect of each user's relevance information. Up to this point, only an α value of $$\frac{1}{U},$$

for a collaborating group consisting of U users, has been considered, whereby all users are considered equally.

The nature of a synchronous collaborative information retrieval session means that there will be multiple collaborating searchers 301, 302, . . . n providing relevance information 306. Each of these users will have a certain level of expertise, some users may be more familiar with a topic than others, and this expertise is reflected in their relevance judgments. For example, a novice user may not understand the search topic entirely, and therefore may be mistaken in their relevance assessments. Poor relevance assessments, unless recognized and dealt with, can pollute the group's profile and degrade subsequent relevance feedback query reformulations.

Another embodiment of the present invention proposes to attach an authority weight to each user's relevance information, and to incorporate this authority information into the combination of relevance information process. Table 1.2 below illustrates the application of an authority weighting method (labeled 'auth') upon the partial-user example previously shown in Table 1.1 (Stage A combination with =0.5 for each user). In this example, it is assumed that user 301 has been assigned an authority value of 0.75, and user 302 has an authority value of 0.25.

TABLE 1.2

'partial user relevance weighting with authority' example

| Term | $r_{1i}$ | $r_{2i}$ | $rw_1$ | $ow_1$ | $rw_2$ | $ow_2$ | purw | puow | purw-auth | puow-auth |
|---|---|---|---|---|---|---|---|---|---|---|
| t1 | 2 | 2 | 3.97 | 7.95 | 3.97 | 7.95 | 3.97 | 7.95 | 3.97 | 7.95 |
| t2 | 2 | 1 | 3.97 | 7.95 | 2.24 | 2.24 | 3 | 4.5 | 3.43 | 6.01 |
| t3 | 1 | 2 | 2.24 | 2.24 | 3.97 | 7.95 | 3 | 4.5 | 2.61 | 3.26 |
| t4 | 1 | 1 | 2.24 | 2.24 | 2.24 | 2.24 | 2.24 | 2.24 | 2.24 | 2.24 |
| t5 | 2 | 0 | 3.97 | 7.95 | 0.52 | 0 | 2.24 | 2.24 | 3 | 4.49 |
| t6 | 0 | 2 | 0.52 | 0 | 3.97 | 7.95 | 2.24 | 2.24 | 1.49 | 0.75 |

TABLE 1.2-continued

'partial user relevance weighting with authority' example

| Term | $r_{1i}$ | $r_{2i}$ | $rw_1$ | $ow_1$ | $rw_2$ | $ow_2$ | purw | puow | purw-auth | puow-auth |
|------|------|------|------|------|------|------|------|------|-----------|-----------|
| t7 | 1 | 0 | 2.24 | 2.24 | 0.52 | 0 | 1.49 | 0.75 | 1.88 | 1.41 |
| t8 | 0 | 1 | 0.52 | 0 | 2.24 | 2.24 | 1.49 | 0.75 | 1.06 | 0.26 |
| t9 | 0 | 0 | 0.52 | 0 | 0.52 | 0 | 0.52 | 0 | 0.52 | 0 |

In Table 1.2, for terms where users agree on the weighting, (t1, t4, t9), the formula produces the same result as per the standard partial-user formula. For terms where the users disagree (t2, t3, t5, t6, t7, t8), the formula produces an estimate based on a weighted combination, wherein the combined values are closer to user 301's estimates than user 302's.

Techniques have been proposed in the literature, to estimate the quality of a ranked list (Cronen-Townsend et al., 2002; He and Ounis, 2004; Yom-Tov et al., 2005; Vinay et al., 2006; Zhou and Croft, 2006, 2007; Diaz, 2007). If an effective measure of authority for each user can be extracted, then this weighting can be used to allow the more authoritative user to influence the relevance feedback process and thereby improve the quality of the ranked lists returned to group members.

Shared Terms

An important consideration when combining relevance information from multiple users is what action to take, when weighting a term that appears in all user profiles versus a term, which occurs only in some user profiles. Intuitively, it appears that a term which occurs in a greater number of user profiles, should receive a higher weighting than a term which only occurs in a smaller number of user profiles, since more users have deemed the former term to be relevant. Consider the example from the partial-user weighting shown in Table 1.3 below, wherein it can be observed that terms t4, t5 and t6 are all considered with the same weight, since they each occur in 2 documents. However, perhaps term t4 should be considered as more important, since the 2 documents in which it occurs include one document from each user. This reinforcement of a term can be incorporated into the partial-user weighting formulae, using a simple scaler up-weighter:

$$purw\text{-upweight}(i) = purw(i) \times \beta \quad (1.13)$$

wherein $\beta$ can be used to upweight a term, which occurs in multiple user profiles. For example, $\beta$ could be set as equal to the number of collaborating users which contain the term, in order to upweight the term by the number of users which contain the term in their relevance judgments 306 (e.g. per a CombMNZ approach for ranked lists). Using this approach for term reweighing, more weighting can be provided for terms, which appear in each user's profile, over terms that only occur in a few.

To implement a weighted combination therefore, the partial-user offer weight formula can be extended in a similar way to the partial-user relevance weight formula:

$$puow\text{-upweight}(i) = puow(i) \times \beta \quad (1.14)$$

The result of upweighting the partial-user relevance weight and partial-user offer weight with $\beta$ equal to the number of users that contain the term (i.e. $\beta=2$, if both users have encountered the term, $\beta=1$ if only one has encountered the term and $\beta=0$ if neither user has encountered the term) is illustrate in Table 1.3. As it has been encountered by each user, term t4 is upweighted to reflect its perceived importance, whereby the term is made more significant than either of term's t5 or t6.

TABLE 1.3

'partial user relevance weighting with shared terms upweighed' example

| Term | $r_{1i}$ | $r_{2i}$ | $rw_1$ | $ow_1$ | $rw_2$ | $ow_2$ | purw | puow | purw-upweight | puow-upweight |
|------|------|------|------|------|------|------|------|------|---------------|---------------|
| t1 | 2 | 2 | 3.97 | 7.95 | 3.97 | 7.95 | 3.97 | 7.95 | 7.95 | 15.9 |
| t2 | 2 | 1 | 3.97 | 7.95 | 2.24 | 2.24 | 3 | 4.5 | 6 | 8.99 |
| t3 | 1 | 2 | 2.24 | 2.24 | 3.97 | 7.95 | 3 | 4.5 | 6 | 8.99 |
| t4 | 1 | 1 | 2.24 | 2.24 | 2.24 | 2.24 | 2.24 | 2.24 | 4.49 | 4.49 |
| t5 | 2 | 0 | 3.97 | 7.95 | 0.52 | 0 | 2.24 | 2.24 | 2.24 | 2.24 |
| t6 | 0 | 2 | 0.52 | 0 | 3.97 | 7.95 | 2.24 | 2.24 | 2.24 | 2.24 |
| t7 | 1 | 0 | 2.24 | 2.24 | 0.52 | 0 | 1.49 | 0.75 | 1.49 | 0.75 |
| t8 | 0 | 1 | 0.52 | 0 | 2.24 | 2.24 | 1.49 | 0.75 | 1.49 | 0.75 |
| t9 | 0 | 0 | 0.52 | 0 | 0.52 | 0 | 0.52 | 0 | 0 | 0 |

A method has been described above for implementing collaborative relevance feedback in a synchronous collaborative information retrieval system 303, whereby a collaborating group of searchers 301, 302 may find relevant information more effectively through an automated sharing of knowledge policy, wherein the automation is achieved by incorporating the relevance information 306 from each collaborating searcher into the relevance feedback process in real time. Variations of the method have described as two extensions to the standard combination of relevance information techniques, which incorporate the authority of users and the overlap of user's relevance judgments.

The following now describes an implementation of the above methods as respective algorithms for configuring the terminals of FIGS. 1 and 2 to perform a synchronous collaborative searching task incorporating relevance feedback according to embodiments of the invention. FIG. 4 details the steps according to which at least data processing terminals 101 and 102 operate according to a first embodiment of the present invention, FIG. 5 details the steps according to which at least data processing terminals 101 and 102 operate according to a second embodiment of the present invention incorporating the upweighting variation, and FIG. 6 details the steps according to which terminal 102 operates according to a further embodiment of the present invention intended for co-located users.

Processing steps are described in FIG. 4 according to which at least two of terminals 101, 102, 105 and 106 may operate according to a preferred embodiment of the present invention. For the sake of clarity, the following description will be limited to terminals 101 and 102, but it will be readily apparent to those skilled in the art that many more terminals may be used simultaneously, in accordance with the synchronous and collaborative characteristics of the data searching method and system described herein.

Terminal 101 is first switched on at step 401. At step 402, a set of instructions is loaded which provides said terminal 101 with basic functionality, such as initialization of data input and/or output devices, data file browsing, keyboard and/or mouse input data processing, video data outputting, network connectivity and network data processing. Upon completing these initialization and loading steps 401, 402, terminal 101 is optimally configured to receive and process network input data and to process and transmit network output data, whereby terminal 101 establishes the connection 205 to the system show in FIG. 1 at step 403.

At step 404, an application, the synchronous collaborative information retrieval engine 303, is loaded into memory 209, which is a set of instructions for configuring CPU 208 to process data according to the method described above, transposed as rules described hereafter. A user profile 307 is also loaded at step 404, which stores at least one or more terms used by the user 301 of terminal 101 for formulating data locating queries. In this embodiment, the profile aggregating module 308 is however not invoked at step 406, until such time as at least another terminal has performed steps 401 through to 404 and initiated its own synchronous collaborative information retrieval engine application 303 and loaded a second user profile 307, in the example terminal 102 of user 302, at step 405.

A first query may be input at step 407 by user 301 at terminal 101, as part of a synchronous collaborative search task. The search query is processed at step 408 and search results are output at step 409, for instance within a graphical user interface (GUI) output to VDU 202. A first question is asked at step 410, as to whether the search results satisfy the information need.

Figure 5:
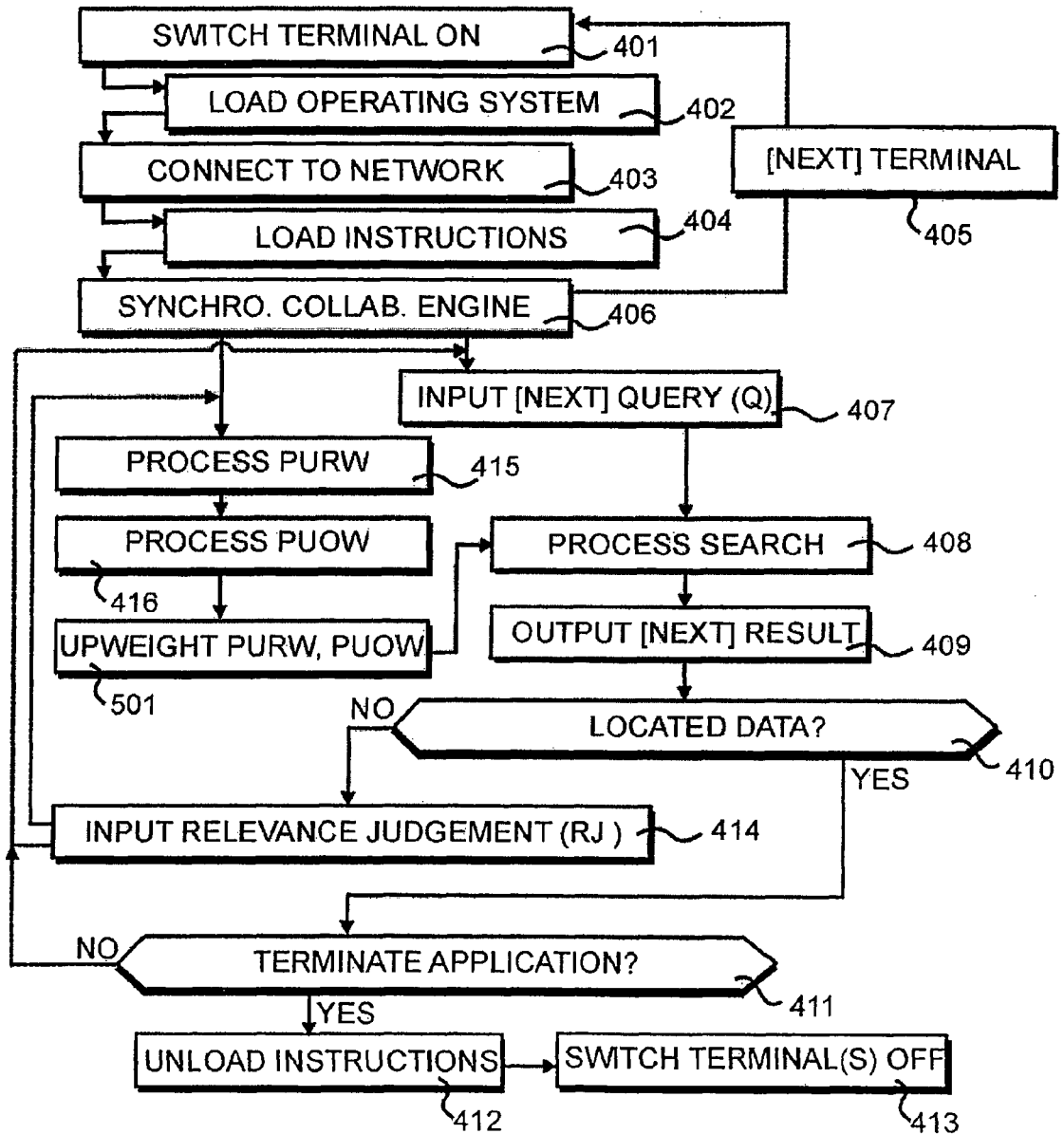
FIG. 5 details the steps according to which at least two data processing terminals, such two or more of the terminals shown in FIGS. 1 and 2, would operate according to a variation of the embodiment shown in FIG. 4.

It will be readily understood by those skilled in the art, that the operational steps described in FIGS. 4, 5 and 6 illustrate a data processing routine, which is cyclical by nature and intentionally iterative and, pursuant to the well established fact that an initial search string rarely if ever satisfies an information need, the question of step 410 is likely to always be answered negatively during the first loop through the routine at least, and likely to be eventually answered positively, as and when users 301, 302 have sufficiently refined the search parameters through iterative input of successive relevance judgment.

Thus, as and when the question of step 410 is answered positively and the information need is satisfied, a second question is asked at step 411, as to whether the user still has any need for the synchronous collaborative information retrieval engine application 303, i.e. whether the application loaded at step 404 should be unloaded from memory 209. If this question is answered positively, then the application may be unloaded at step 412, and the terminal used for whatever other purposes or switched off at step 413. Alternatively, the user still has a need for the synchronous collaborative information retrieval engine application 303, i.e. a new information need to satisfy, whereby the question is asked of step 411 is answered negatively and control returns to step 407, at which a new first query may be input.

Conversely, as and when the question of step 410 is answered negatively and the information need is not yet satisfied, control proceeds to step 414, at which relevance judgment data 306 may be input by user 301 (or user 302 at terminal 102 configured in an identical manner, and at any time) by means of keyboard 203 or mouse 204. Further to the input of relevance judgment data 306, control proceeds twofold: insofar as user 301 (or 302) is concerned, control returns to step 407, at which the user may input a subsequent query, i.e. refine the parameters used when formulating the previous query, which did not yet satisfy the information need. According to an embodiment of the invention, control also proceeds to step 415, at which the partial-user relevance weight (PURW) is processed by synchronous collaborative information retrieval engine application 303, then to step 416, at which the partial-user offer weight (PUOW) is processed by synchronous collaborative information retrieval engine application 303. The respective outputs of steps 415 and 416 are then used by the profile aggregating module 308 to update the user profiles 307 at each of terminals 301, 302, whereby the processing of the subsequent query input by user 301 (or user 302) at step 407, is enhanced by the relevance judgment 306 last input by user 302 (or user 301) at step 414. Accordingly, the next set of results to be output at the next iteration of step 409, benefits from the relevance judgment 306 input by a remote user in addition to any local query amendments. Following the iterative process hereinbefore described, the question of step 410 is then eventually answered positively.

Processing steps are described in FIG. 5 according to which at least two of terminals 101, 102, 105 and 106 may operate according to another embodiment of the present invention, in which the partial-user relevance weight (PURW) by a scale up-weighter β at additional step 501. The output of step 501 is then used by the profile aggregating module 308 to update the user profiles 307 at each of terminals 301, 302, whereby the processing of the subsequent query input by user 301 (or user 302) at step 407, is enhanced by the relevance judgment 306 last input by user 302 (or user 301) at step 414, and the relative weighting of terms used in the queries.

Processing steps are described in FIG. 6 according to which terminal 102 may operate according to yet another embodiment of the present invention, in which at least two co-located users 301, 302 use a single terminal to perform the searching task, i.e. interact with the DiamondTouch electronic tabletop system configured for simultaneous operation by the at least two users. The operational steps of FIG. 6 vary over those described above in relation to FIG. 4, only to the extent that step 405, which relates to the initialization of at least a second remote terminal 102, is redundant in this particular embodiment and is replaced by an equivalent step 601, which relates to the initialization of at least a second user 302. A plurality of user profiles 307 are therefore still loaded and updated by the profile aggregating module 308, with the respective outputs of steps 415 and 416 (and step 501 in yet a further embodiment).

The words "comprises/comprising" and the words "having/including" when used herein with reference to embodiments of the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

What is claimed is:

1. A method for locating data in a distributed data environment, wherein at least two users in the environment collaborate synchronously in a real time session to search for the same target information in order to satisfy a common information need, the at least two users each synchronously submitting a data locating query, the at least two users each synchronously receiving a query result, the method comprising the steps of:
   (a) if, for each user, a newly received query result does not satisfy the common information need, the at least two users each synchronously inputting relevance feedback data in response to the newly received query result;
   (b) combining, by a processor connected to the distributed data environment, the respective relevance feedback data in real time such that parameters corresponding to terms used in the respective data locating queries are calculated based on the respective relevance feedback data;
   (c) the at least two users synchronously reformulating their respective data locating queries and submitting the respective reformulated data locating queries;
   (d) processing, in real time, the reformulated data locating queries based on the newly calculated parameters such that the at least two users each synchronously receive a new query result; and
   (e) repeating, if necessary, steps (a) through (d) until, for at least one user, the newly received query result satisfies the information need.

2. The method of claim 1, wherein the steps of submitting a data locating query, receiving a query result, and inputting respective relevance feedback data in response to the received query result by each user, are performed at a same shared user terminal.

3. The method of claim 1, wherein the steps of submitting a first data locating query, receiving a query result, and inputting respective relevance feedback data in response to the received query result by each user, are performed at respective different user terminals.

4. The method of claim 1, further comprising the step of storing a respective user profile for each of the said at least two users, each user profile having term relevance statistics for each term of the respective relevance feedback data.

5. The method of claim 4, wherein the step of combining the respective relevance feedback data further comprises extending proportions of a term using a linear combination of each user's relevance statistics for the said term.

6. The method of claim 5, wherein the step of extending proportions of a term further comprises using a value α for controlling the effect of each user's relevance information.

7. The method of claim 6, wherein the step of extending proportions of a term further comprises using a value β for weighing the controlled effect of each user's relevance information.

8. The method of claim 6, wherein the value α is $$\frac{1}{U}$$

for a group consisting of U users.

9. The method of any of claim 5 to 8, further comprising the step of assigning an authority value to each user's relevance statistics.

10. A system for locating data in a distributed data environment, the environment comprising a plurality of network-connected data terminals and wherein at least two users collaborate synchronously in a real time session to search for the same target information in order to satisfy a common information need, the system including means for allowing the at least two users to each synchronously submit a data locating query at the beginning of the real-time session, the system including means for allowing the at least two users to each synchronously receive a query result from the data locating query submitted at the beginning of the real-time session, the system comprising at least one network-connected data terminal comprising:
   means for allowing the at least two users, during each collaboration loop of the session, to each synchronously input respective relevance feedback data in response to a newly received query result if, for each user, the newly received query result does not satisfy the common information need, or to terminate the collaboration loop of the session if, for at least one user, the newly received query result satisfies the information need;
   means for, during each collaboration loop of the session, combining the respective relevance feedback data in real time such that parameters corresponding to terms used in the respective data locating queries are calculated based on the respective relevance feedback data;
   means for allowing the at least two users, during each collaboration loop of the session, to synchronously reformulate their respective data locating queries and submit the respective reformulated data locating queries; and
   means for, during each collaboration loop of the session, processing, in real time, the reformulated data locating queries based on the calculated parameters such that the at least two users each synchronously receive a new query result.

11. The system of claim 10, wherein the means for combining the respective relevance feedback data in real time is a user profile aggregator.

12. A user terminal for locating data in a distributed data environment and wherein at least two users collaborate synchronously in a real time session to search for the same target information in order to satisfy the common information need, the terminal including means for allowing the at least two users to each synchronously submit a data locating query at the beginning of the real-time session, the terminal including means for allowing the at least two users to each synchronously receive a query result from the data locating query submitted at the beginning of the real-time session, the terminal comprising:
   means for allowing the at least two users, during each collaboration loop of the session, to each synchronously input respective relevance feedback data in response to a newly received query result if, for each user, the newly received query result does not satisfy the common information need, or to terminate the collaboration loop of the session if, for at least one user, the newly received query result satisfies the information need;
   means for, during each collaboration loop of the session, combining the respective relevance feedback data in real time such that parameters corresponding to terms used in the respective data locating queries are calculated based on the respective relevance feedback data;
   means for allowing the at least two users, during each collaboration loop of the session, to synchronously reformulate their respective data locating queries and submit the respective reformulated data locating queries; and means for, during each collaboration loop of the session, processing, in real time, the reformulated data locating queries based on the calculated parameters such that the at least two users each synchronously receive a new query result.

13. A non-transitory data-carrying medium storing computer-readable instructions for locating data in a distributed data environment, wherein the instructions, when read by a computer, configure the computer to perform the method of any of claim 1 to 9.

* * * * *